Nov. 23, 1948.  C. E. MEYERDICK  2,454,608
LUGGAGE CARRIER AND PROTECTOR
Filed Nov. 25, 1946  3 Sheets-Sheet 1

INVENTOR.
Clarence E. Meyerdick
BY
ATTORNEYS.

Nov. 23, 1948. C. E. MEYERDICK 2,454,608
LUGGAGE CARRIER AND PROTECTOR
Filed Nov. 25, 1946 3 Sheets-Sheet 2
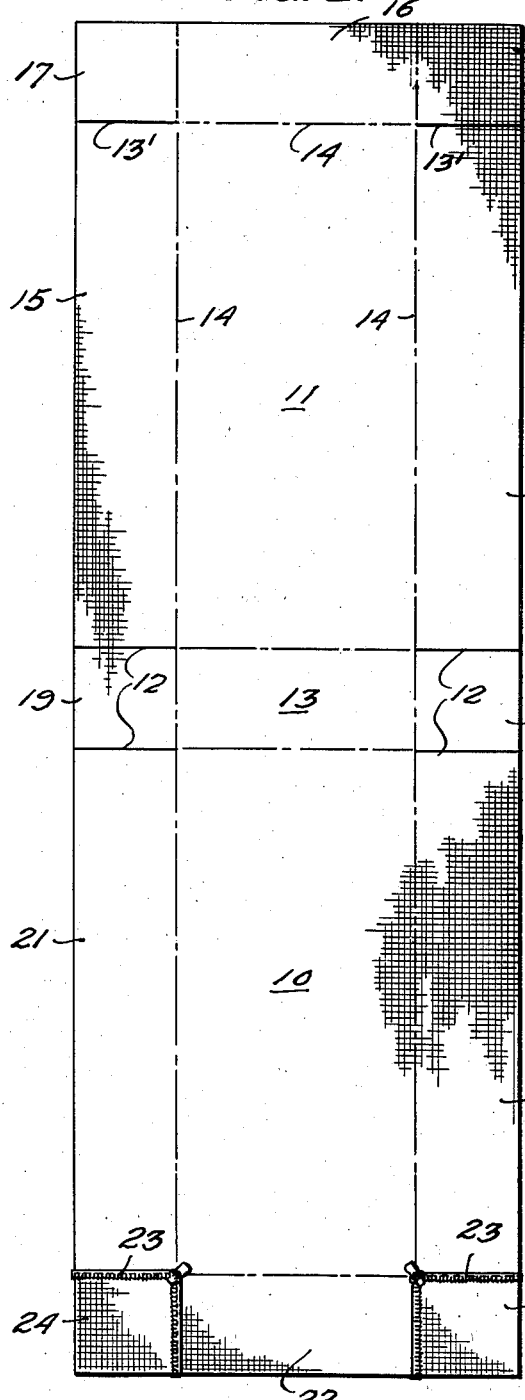
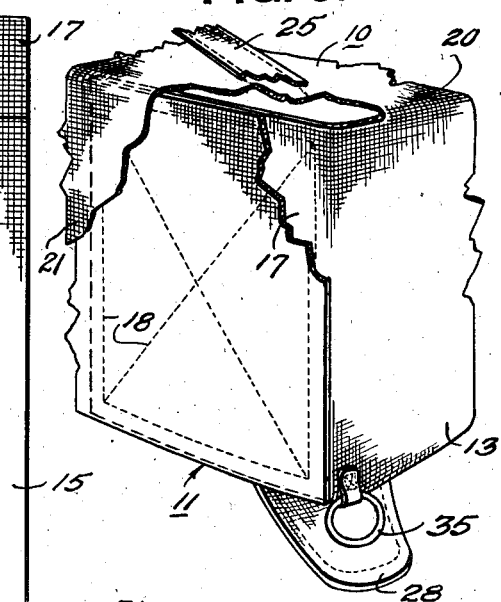
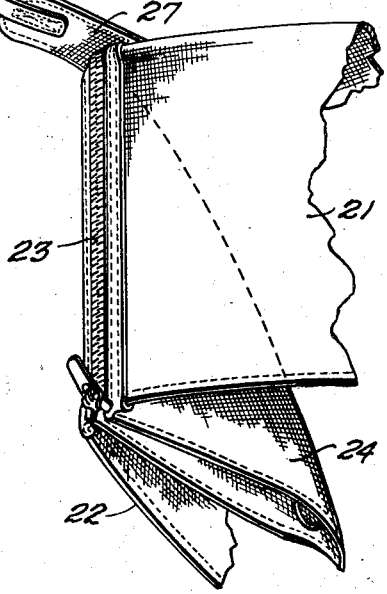
INVENTOR.
Clarence E. Meyerdick
ATTORNEYS.

Nov. 23, 1948.  C. E. MEYERDICK  2,454,608
LUGGAGE CARRIER AND PROTECTOR
Filed Nov. 25, 1946  3 Sheets-Sheet 3

INVENTOR.
Clarence E. Meyerdick
BY
ATTORNEYS.

Patented Nov. 23, 1948

2,454,608

UNITED STATES PATENT OFFICE 2,454,608

LUGGAGE CARRIER AND PROTECTOR

Clarence E. Meyerdick, Fair Oaks, Calif.

Application November 25, 1946, Serial No. 712,192

7 Claims. (Cl. 224—42.1)

This invention relates to an automobile top duffle bag and has for its primary object to provide a combined luggage carrying bag of large capacity and sleeping bag which is adapted for transportation on the top of an automobile and when in use as an outdoor sleeping bag will afford the greatest comfort and protection.

Another object of the invention is to provide a fabric duffle bag which will hug the car top when loaded and secured in place thereon, and which can be used for other purposes such as covering and storage of bedding and other outdoor camping equipment and the like either on the car top or easily removed therefrom and used on the ground.

Another object of the invention is to provide a duffle bag which will distribute the load evenly and fit snugly over the entire car top surface without marring or damaging the same.

Other objects and advantages of my invention will appear in the following specification describing in detail a highly satisfactory construction thereof and claimed hereinafter.

In the accompanying drawings forming a part of this specification:

Fig. 2 is a plan view of the fabric for a duffle bag in accordance with my invention.

Figs. 5 and 6 are fragmentary perspective views of corners at opposite ends of the bag.

Figure 1:
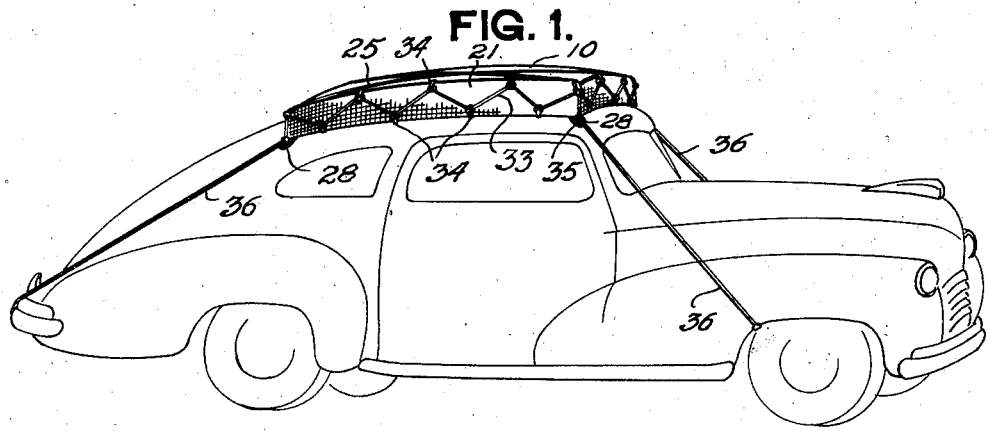
Fig. 1 is a perspective view illustrating a duffle bag in accordance with my invention secured in place on top of an automobile.

Referring to the drawings the duffle bag, in accordance with my invention, is formed of a waterproof fabric such as canvas or any other suitable material in rectangular formation as illustrated in Fig. 2 which constitutes the top 10 and bottom 11 for the duffle bag. The bag is preferably formed of a continuous single piece of material although any number of pieces may be united if necessary or desirable in some instances.

Figure 7:
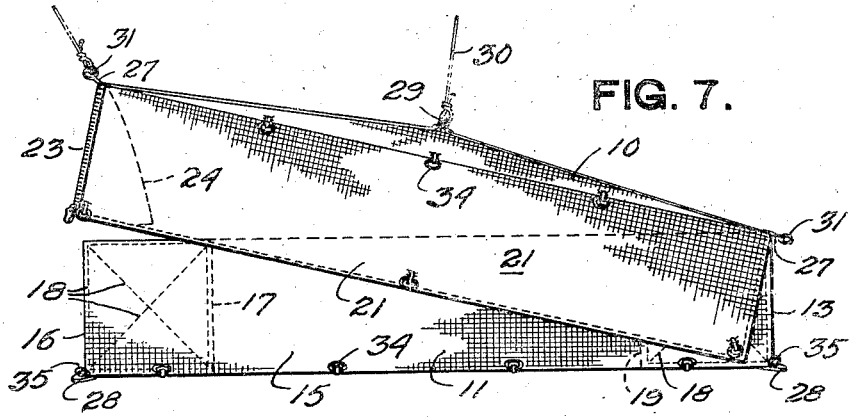
Fig. 7 is an elevation view showing the top of the bag in a partially elevated position.

The top and bottom elements are defined by four slits 12 in the mid portions of the material which also define the depth and common end 13 of the bag which unites the top and bottom. These slits 12, slits 13' and fold lines 14 in the end of the bottom section define the sides 15 and end 16 of the bottom section and tabs 17 which are extended inwardly to overlap sides 15 and stitched thereto as indicated at 18 in Figs. 5 and 7. Slits 12 also define tabs 19 which are similarly stitched to sides 15 of bottom 11.

The arrangement above set forth provides a rectangular bag structure of the duffle bag from which the top member 10 extends in the manner of a hinge connection along line 20. The structure of top 10 differs from bottom 11 in that the sides 21 and end 22 are not severed by slits, the material remains integral and zipper type af fasteners 23 are secured along the edge lines of the side and end portions. These fasteners 23 define integral squares 24 rather than tabs, in the corners, which when the zippers are drawn to closed position are extended and folded inwardly of top 10 as shown in Fig. 6. This construction is desirable so as to provide a relatively large and integral canopy with the zippers in open position as shown in Figs. 8 and 9 for use as a covering or tent structure integral with the bag bottom for use as a protected sleeping bag.

Figure 3:
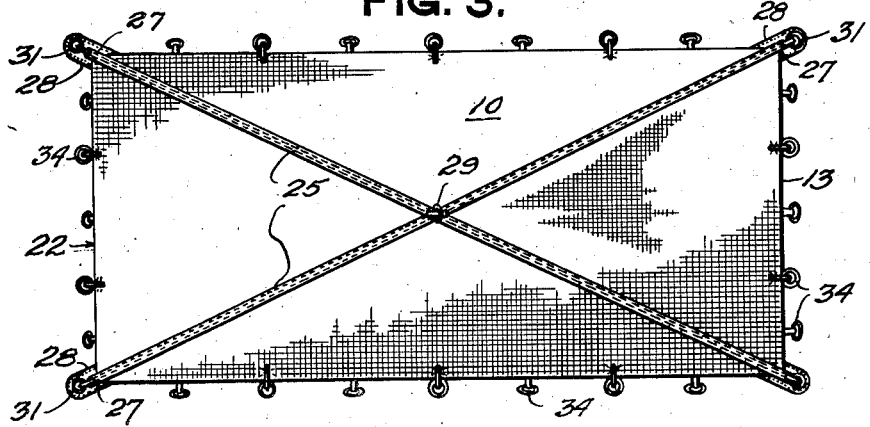
Fig. 3 is a top plan view of the finished duffle bag in closed condition.
Figure 4:
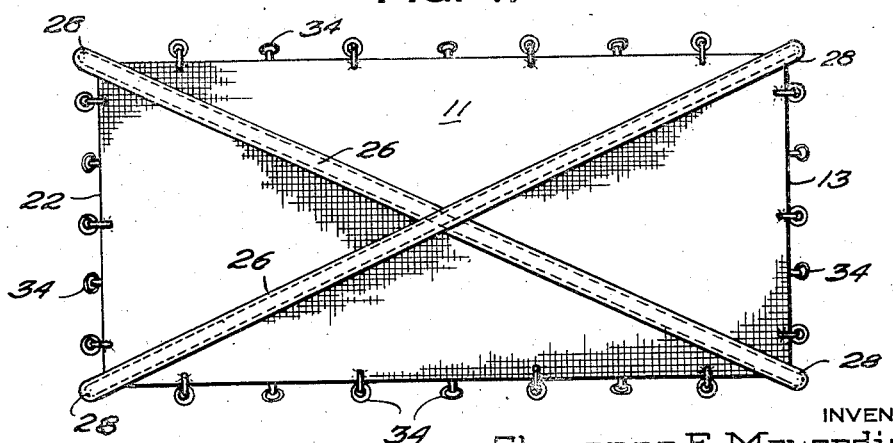
Fig. 4 is a similar bottom plan view thereof.

The duffle bag is reinforced top and bottom by means of pairs of fabric strips 25 and 26 respectively secured diagonally across the top and bottom sections and crossing each other in the middle as shown in Figs. 3 and 4. These strips extend at each end beyond the confines of the bag structure providing upper and lower tabs 27 and 28 respectively.

Strips 25, where they cross, are provided with a ring 29 to which a rope or the like 30 may be secured for suspending the middle of the top section and rings 31 are secured to the ends of tabs 27 for receiving a rope 32 for suspension purposes or lacing the bag closed on a cord or rope 33 as shown in Fig. 1, rings 34 being secured to the top and bottom sections for the purpose. Rings 35 are secured to the corners of bag bottom and upper side of tabs 28 instead of to the ends of the tabs. This affords a protection to the top of the car, intervening between the surface of the car top and ropes 36 which extend from these rings and have their outer ends secured to the car structure in the manner indicated or the like.

Figure 8:
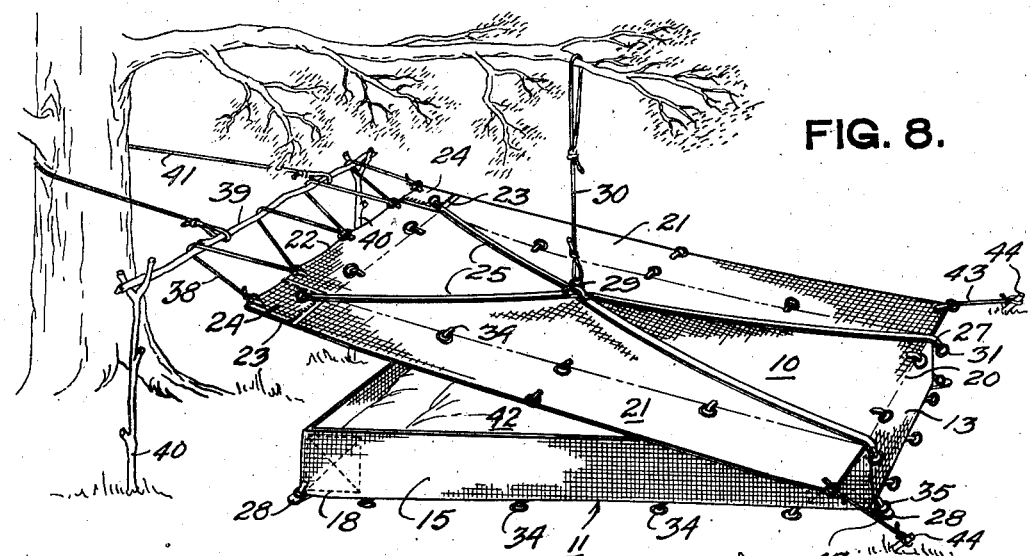
Fig. 8 is a perspective view illustrating the bag as employed as a bed the top being supported from a tree.
Figure 9:
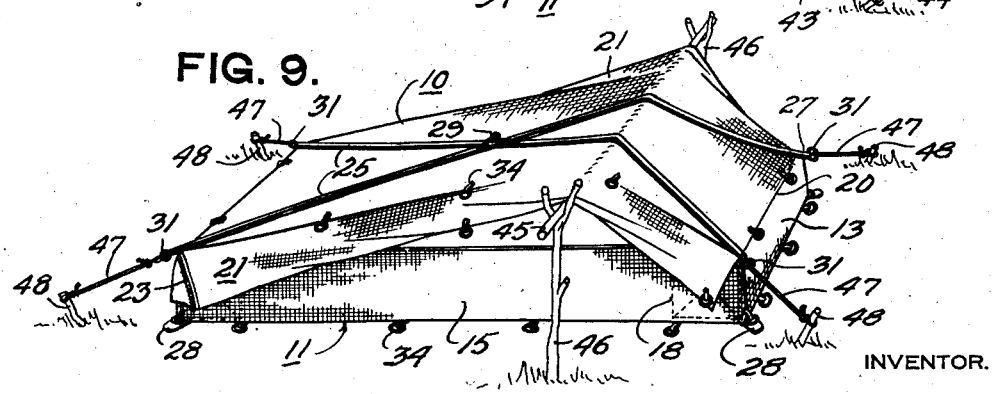
Fig. 9 is a perspective view illustrating another manner of arranging the bag as a bed, in the absence of trees.

When not in use on the automobile top or removed therefrom and used for storage purposes the bag may be employed as a protected bed as shown in alternative forms Figs. 8 and 9 or otherwise. As shown in Fig. 8 the free part of top 10 is suspended in an elevated position, a cord 30 being connected with ring 29 and a branch of a tree and the end of the top laced by means of a cord 38 to a bar or stick 39 supported in forked sticks 40 and further braced by a cord 41 connected with bar 39 and surrounding the trunk of the tree. By this arrangement cover 10 extends above and well beyond the bedding 42 in the bag bottom 11. Cords 43 connected between the lower corners of cover 10 and stakes 44 maintain the entire cover as a stretched inclined canopy with the portion above the head of the bed in a well elevated position.

In Fig. 9 the arrangement is such as to partially elevate cover 10, where trees are not available or it is otherwise desirable to maintain closer sleeping quarters. In this arrangement a bar 45 supported on forked sticks 46 maintains a mid portion of cover 10 at a desired elevation and cords 47 connected between corner ring 31 on the ends of tabs 27 and stakes 48 maintain the cover tensioned over the bottom 11 in which the bed is made. In this arrangement the ends of sides 21 depend and end 22 covers a portion of the end of bottom 11, thus providing more protection to the sleeper at the sides.

Having described a highly satisfactory form of my duffle bag for automobile tops which is constructed for use as an outside sleeping bag, storage bag and the like what I claim as my invention and desire to secure by Letters Patent is:

1. A duffle bag for luggage to be carried on the top of an automobile comprising, connected top and bottom sections composed of a rectangular fabric strip forming a rectangular bag for the bottom section, said top section extending from an upper edge of said bottom section, the remote end of said top section having slide fastening elements secured thereto from points within the body of the top section adjacent to the corners thereof and diverging outwardly to the side and end edges defining square sections at the corners, said corners being foldable upon themselves inwardly upon the closure of the slide fastening elements to provide a closed end cover bag element with depending side portions and an end portion of the top section.

2. A convertible bag for use as a luggage carrier or sleeping bag to be carried on the top of an automobile comprising, connected top and bottom sections composed of a rectangular fabric strip formed into a rectangular bag for the bottom section having a bottom, side and end portions, said top section extending from an upper edge of said bottom section, the remote end of said top section having slide fastening elements secured thereto from points within the body of the top section adjacent to the corners thereof and diverging outwardly to the side and end edges defining square sections at the corners, said corners being foldable upon themselves inwardly upon the closure of the slide fastening elements to provide a closed end cover bag element including a top portion with depending side portions and an end portion of the top section, said top and bottom sections each having crossed reinforcing strips secured to and extending diagonally from corner to corner of its respective top and bottom portions and extending beyond said corners thereof as projecting tab elements, cord receiving rings secured to the ends of the top section reinforcing strip tab elements, a ring secured to said reinforcing strips at their intersection at the center of the top portion to provide for securing a cord supporting means thereto and rings carried by the convertible bag and located adjacent to the lower edges of the bottom portion, the reinforcing strip tab elements projecting therefrom and the edges of the top portion.

3. A convertible bag for use as a luggage carrier or sleeping bag to be carried on the top of an automobile comprising, connected top and bottom sections composed of a rectangular fabric strip formed into a rectangular bag for the bottom section having a bottom, side and end portions, said top section extending from an upper edge of said bottom section and including a top, side and end portions, said top and bottom sections each having crossed reinforcing strips secured to and extending diagonally from corner to corner of its respective top and bottom portions and extending beyond said corners thereof as projecting tab elements, cord receiving rings secured to the ends of the top section reinforcing strip tab elements, a ring secured to said reinforcing strips at their intersection at the center of the top portion to provide for securing a cord supporting means thereto and rings carried by the convertible bag and located adjacent to the lower edges of the bottom portion, the reinforcing strip tab elements projecting therefrom and the edges of the top portion.

4. A convertible bag for use as a luggage carrier or sleeping bag comprising connected top and bottom sections composed of a rectangular fabric strip forming a rectangular bag, the bottom section comprising bottom, side and end portions, said top section extending from an upper edge of said bottom section and composed of a top portion and side and end portions adapted to overlap the bottom section side and end portions, said top section having crossed reinforcing strips secured to and extending diagonally from corner to corner of the top portion thereof, and extending beyond said corners as projecting tab elements, cord receiving rings secured to the ends of reinforcing strip tab elements for use in securing the bag in a closed condition on the top of an automobile or for supporting the top section of the bag with the free end thereof in an elevated position, and a cord receiving ring secured to said crossed reinforcing strips at their intersectiton whereby the central portion of the top section may also be supported in an elevated position when used as a sleeping bag.

5. A convertible bag for use as a luggage carrier or sleeping bag to be carried on the top of an automobile comprising, connected top and bottom sections composed of a rectangular fabric strip forming a rectangular bag, the bottom section comprising bottom, side and end portions, said top section extending from the upper edge of said bottom section and composed of a top portion and side and end portions adapted to overlap the bottom section free side and end portions, crossed reinforcing strips secured to and extending diagonally from corner to corner of the top portion and extending beyond the said corners as projecting tab elements, and rings carried by the ends of said tab elements whereby the bag can be tied to an automobile top or for supporting the bag top section for use as a sleeping bag.

6. A convertible bag for use as a luggage carrier or sleeping bag to be carried on the top of an automobile comprising a unitary substantially rectangular fabric strip, said strip being formed into a rectangular bottom section comprising a bottom with upstanding side and end walls, the side and end walls being connected along their meeting edges, the end walls having extending flap portions of the fabric material engaging and secured to the inner sides of the side walls, a top section comprising an extension of the substantially rectangular fabric strip from one of the upstanding walls of the bottom section, and separable fastening elements adjacent to the outer corners of the top section for securing the corners in inwardly overlapped relation to provide downwardly extending walls from the free sides of the top section portion of the strip when desired for overlapping corresponding upstanding walls of the bottom section when the top section is swung to closed position thereover and when the fastening elements are opened freeing the portions of the top section so that corners may be extended and the entire top section including the corners may be extended so as to extend laterally beyond the bottom section sides and free end converting the bag for use as a sleeping bag.

7. A convertible bag for use as a luggage carrier or sleeping bag to be carried on the top of an automobile comprising a rectangular bottom section including a bottom portion with upstanding side and end wall portions, the side and bottom walls being connected along their meeting edges, the end walls having extending flap portions of the fabric material engaging and secured to the inner sides of the side walls, a rectangular top section connecter with one of the upstanding walls of the bottom section, and separable fastening elements adjacent to the outer corners of the top section for securing the corners in inwardly overlapped relation to provide downwardly extending walls from the free sides of the top section portion of the strip when desired for overlapping corresponding upstanding walls of the bottom section when the top section is swung to closed position thereover and when the fastening elements are opened freeing the portions of the top section so that corners may be extended and the entire top section including the corners may be extended so as to extend laterally beyond the bottom section sides and free end converting the bag for use as a sleeping bag.

CLARENCE E. MEYERDICK.

REFERENCES CITED

The following references are of record in the file of this patent:

UNITED STATES PATENTS

| Number | Name | Date |
| --- | --- | --- |
| 922,334 | Regenstein | May 18, 1909 |
| 1,089,103 | Barnard | Mar. 3, 1914 |
| 1,315,294 | Fink et al. | Sept. 9, 1919 |
| 2,105,989 | Rush | Jan. 18, 1938 |
| 2,254,578 | O'Brien | Sept. 2, 1941 |